3,380,957
POLYMERIZATION OF CYCLIC OXIDE MONOMERS IN THE PRESENCE OF A FILLER DISPERSION
Otto C. Elmer, Akron, and Elbert E. Gruber, Cuyahoga Falls, Ohio, assignors to The General Tire & Rubber Company, Akron, Ohio, a corporation of Ohio
Filed Feb. 11, 1965, Ser. No. 431,869
7 Claims. (Cl. 260—41)

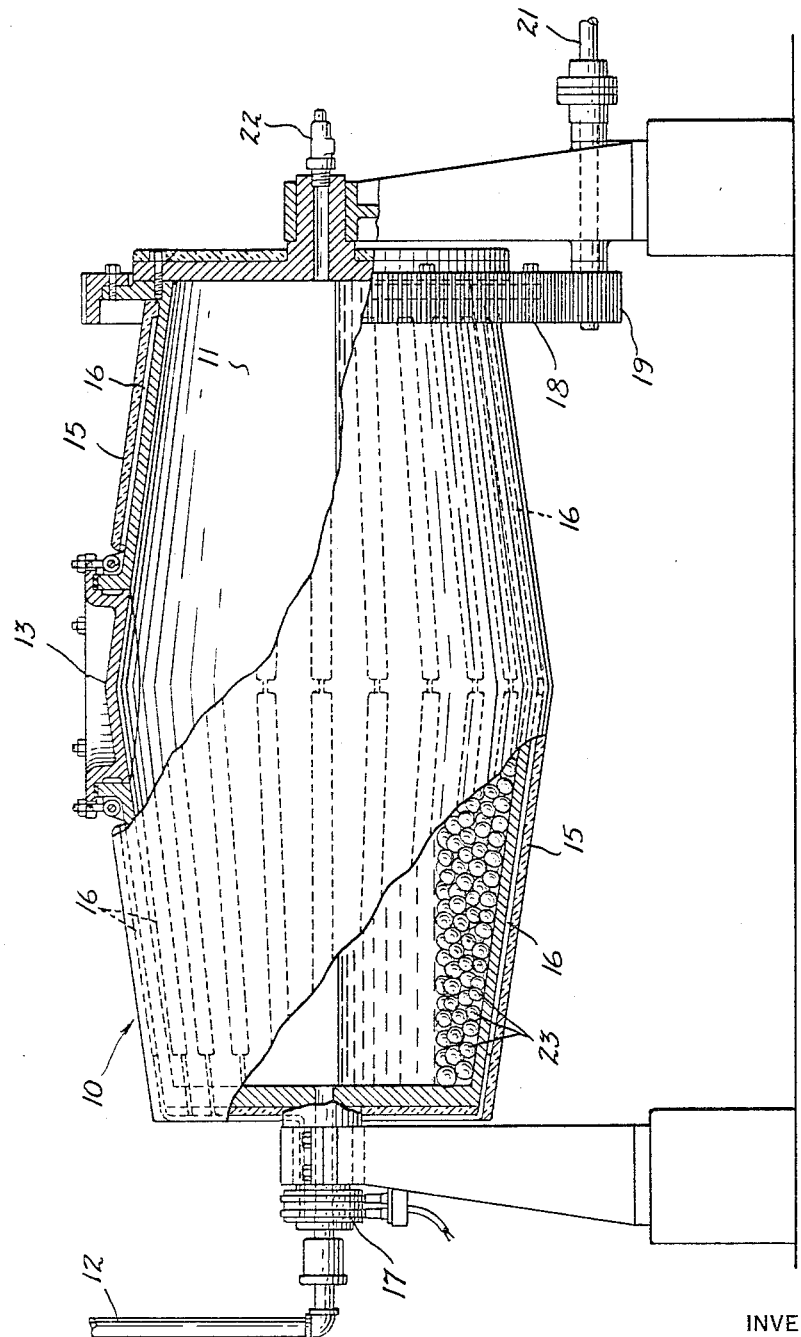

ABSTRACT OF THE DISCLOSURE

Polyethers having improved physical properties, such as improved abrasion resistance, are obtained by polymerizing an epoxide or oxetane monomer in solvent using a suitable catalyst in admixture with a reinforcing filler while subjecting the resulting mixture to shear agitation in the presence of grinding media, for example, by using a ball mill. The process may be conducted in two steps whereby the filler and at least a portion of the catalyst are subjected to shear agitation followed by addition of the monomer and any additional catalyst required and conducting polymerization of the monomer while continuing to shear agitate the mixture.

---

This invention relates to the polymerization of a cyclic oxide in the presence of a finely-divided, dispersed filler and to the resulting product.

It has heretofore been proposed to polymerize diolefins and mixtures of diolefins in the presence of reinforcing fillers such as carbon black. The properties of any polymer thus produced have not been outstanding and the process has not gone into commercial use. Carbon black has been incorporated into diene polymer solely by milling it into the solid rubber or by mixing it into the solid rubber or via the latex route in which case it does not assume its full function as a reinforcing pigment until the coagulum has been milled.

In the case of rubbery polymers of cyclic oxides such as the copolymer of a major proportion of propylene oxide and a minor proportion of allyl glycidyl ether, the abrasion resistance of cured polymers in which the black has been incorporated by milling has been unsatisfactory. Apparently, the agglomerates of black are not sufficiently broken up to provide good dispersion or the tendency of the polymer to adequately wet the black or reinforcing pigment is insufficient to obtain the optimum abrasion resistance.

Attempts have been made to polymerize olefin oxides in the presence of carbon black. The carbon black or reinforcing pigment has interfered with the polymerization so that a desirable polymer has not been produced. Apparently, carbon black or reinforcing pigments have a tendency to deactivate the catalyst. This also has been the case where solvent has been present in addition to the black.

It is an object of the present invention to produce cyclic oxide rubbers exhibiting improved reinforcement or an improvement in abrasion resistance.

It is another object of the present invention to provide a method of making rubber-like cyclic oxide polymers wherein the filler or reinforcing pigment is effectively incorporated into the polymer when it is made.

These and other objects and advantages of the present invention will become more apparent to those skilled in the art from the following detailed description of the invention and examples, including the accompanying drawing.

According to the present invention, it has been discovered that rubbery polymers may be produced exhibiting unexpectedly improved abrasive resistance by preconditioning the reinforcing pigment or filler with some catalyst usually in the presence of solvent. This may be done by (a) charging a suitable closed container which is equipped for agitation or for subjecting the contents to a shearing or grinding action, with filler, catalyst and solvent, (b) mechanically deagglomerating or dispersing the filler, as by subjecting the filler to shear forces in the presence of the solvent and catalyst, (c) charging the apparatus with polymerizable monomer and (d) polymerizing the monomer within the apparatus while continuing to agitate so that the filler is further conditioned and is actively dispersed throughout the polymer. Additional solvent may be added after (b) if desired. If other additives are deemed necessary, they may be added either in the agitation unit so as to intimately mix with the monomer during polymerization, or such additives, as sulphur, zinc oxide and stearic acid, may be mixed into the polymer on a mill subsequent to polymerization. The polymer is separated from solvent and may be utilized in a conventional manner. When suitably cured, a flexible rubber of improved properties is produced.

An important aspect of the invention herein resides in the fact that the filler particles are treated and preferably deagglomerated in the presence of catalyst prior to the step of polymerization.

The intimate dispersion of filler with polymerizable monomer is generally achieved by an agitation unit that is suitable for subjecting filler agglomerates to shear or impact in the presence of the monomer, particularly one that permits polymerization and maintenance of pressure within the apparatus itself. The selection of the type of apparatus is dependent primarily on the filler itself and the requirements as to refinement. Typical grinding apparatus are hammer mills, impactors, attrition mills and the like. Particle reduction apparatuses, which are preferred, are tube, ball or pebble mills. The latter types of mills are readily adaptable to maintain pressure and to allow polymerization within the mill itself. A colloid mill equipped for pressure and equipped for recycling of the material is also satisfactory.

The ball mill generally produces a comparatively coarse product using a grinding media of ½ to 5 inches in diameter, while the tube mill generally produces a finer product with an agitation media of a somewhat lower range of sizes. The pebble mill uses a range of sizes for the grinding media slightly larger than the ball mill. Another mill often used to good advantage is a compartment mill, which, through a series of compartments, combines all of the above-mentioned types of mills. Another useful mill is a rod mill, similar to the tube mill, but rods serve as the grinding media.

The grinding media is desirably lengths of chain or balls of metal, flint pebbles, porcelain or zircon pebbles, etc. The agitation media is usually from about ½ to about 12 inches in diameter and preferably from about 1 to 8 inches. There may be several sizes of spheres present in the mill at all times, but preferably the spheres are of the same size. Usually, in a ball mill of 10 to 15 feet in diameter and 14 feet long, the spheres are 1 to 5 inches in diameter. In a pebble mill, the pebbles are advantageously 1 to 7 inches in diameter. It is to be remembered that the agitation media, regardless of the type of apparatus used, depends, to a large measure, on the material to be reduced, its size and the type of agitation used.

The drawing illustrates a side view of a typical agitation unit, shown preferably to be a modified ball mill which functions to condition the filler-solvent-catalyst mixture, and said vessel also serves as a polymerization vessel for the conversion of monomer to polymer.

The ball mill and reactor combination generally shown at 10 comprises a revolving vessel 11 with fluid inlet 12 and sealable hatch 13 to permit the depositing of the components such as filler in the mill. When the vessel is rotated about its longitudinal axis so as to place the hatch below the level of the components within the vessel, the hatch is also used for emptying the vessel. The vessel is surrounded by insulation 15 and a temperature control means shown in the drawing to be electrical heating units 16 connected through a rotary coupling 17 to an electrical source, not shown. Also present is a relief valve 22.

The agitation unit is revolved about its longitudinal axis by means of the toothed gear 18 and pinion 19 connected to the drive shaft 21. Within the unit are agitation media 23 of solid spheres which, upon revolution of the agitation unit, are carried up its side from whence they fall or slide to the bottom to be picked up again and recycled.

The speed of the ball-mill is about 5 to 25 r.p.m. for a large mill of about 10 to 15 feet in diameter. This speed is somewhat less than the critical speed, or the speed at which the agitation media are carried over and are not released from the walls of the unit. The speed is such that the agitation thus provided is of an amount sufficient to disperse the filler but not of such an amount that the components within the unit are forced to separate.

In the operation of the agitation unit, feed enters the grinding zone as indicated in the drawings and is agitated both by the revolutions of the unit and by the movement of the spheres. Product leaves the unit as indicated in the drawing and is ready to be cured or used as raw polymer.

The agitation operation may be continuous or batch. In a continuous type operation, it may be necessary to agitate the filler particles further by recycling the particles for further agitation and dispersion, or it may be necessary to use several agitation units in succession. Regardless of the method of agitation employed, the filler is thoroughly agitated and subjected to shear or impact so as to insure proper dispersion.

The agitation unit of the present invention is preferentially differentiated from a conventional size reduction mill in that the agitation media of the instant invention is advantageously of one size. Then, too, where normally the volume of the grinding media of the conventional mill will occupy about ½ of the mill, in the instant case the agitation media occupies about 2 to 10% of the available volume. Further, present in the agitation unit is a quantity of solvent and catalyst which tends to cushion or minimize any grinding or pulverizing effect resulting from the cycling of the agitation media. When totally charged with solvent, catalysts, water, monomer and agitation media, the agitation unit is about 5 to 30% or 35% full.

One or more cyclic oxides of 2 to 20 carbon atoms essentially comprise the polymerizable monomer material used in the present invention. These cyclic oxides contain a ring of 2 to 3 carbon atoms and 1 oxygen atom, which ring will open at the carbon-oxygen bond to polymerize and form a polyether. The term, polymerizable monomer, is used herein to designate one or more such cyclic oxides. A portion of the polymerizable monomer preferably present contains more olefinic unsaturation in order that unsaturation may be incorporated along the polymer chain to facilitate the polymer vulcanizing with conventional vulcanizing systems.

Examples of polymerizable monomers fitting within the above definition and which may be polymerized according to the present invention are propylene oxide, 1,2-butene oxide, 2,3-butene oxide, 1,2-dodecene monoxide, isobutylene monoxide, styrene oxide, 1,2-pentene oxide, isopentene oxide, 1,2-diisobutylene oxide, 1,2-hexene oxide, 2,3-hexene oxide, 1,2-heptane oxide, phenyl glycidyl ether, glycidyl methacrylate, 2,3-diisobutylene oxide and the like and mixtures thereof.

The cyclic oxide monomer preferably used in major proportion in the present invention is propylene oxide. Other monomers including 1,2-butylene oxide, ethylene oxide, etc. may also be used as part or all of the saturated oxide. It should be noted, however, that the resistance to swelling in water of cured polymer of the present invention, decreases as the proportion of ethylene oxide is increased and it is, therefore, desirable to use less than 50 percent of ethylene oxide when water resistance is desired.

Those polymerizable monomers most useful for the incorporation of unsaturation into the polymer chain, which unsaturation, incidentally, is in the pendent portion of the chain, are, for example, vicinal epoxides having aliphatic unsaturation such as butadiene monoxide, allyl glycidyl ether, glycidyl acrylate, vinyl cyclohexane monoxide and 2-methyl-5,6-epoxyhexene-1. Polymer may even be produced entirely from allyl glycidyl ether monomer, for example. As mentioned, the use of any of the last mentioned monomers will place the unsaturation in a side chain. When the double bond is separated from the main chain by an ether-oxygen and particularly when it is removed from said ether-oxygen by one or more methylene groups, the polymer has a uniquely improved resistance to thermal and oxidation degradation, superior to those rubbers with the unsaturation in the main segment of the chain or leaving a pendent double bond connected to the main molecular chain only through carbon atoms.

The polymer of the present invention, which polymer is sulfur curable, should usually contain 20 to 99 mole percent of saturated cyclic oxide, preferably propylene oxide, and about 80 to 1 mole percent of the unsaturated cyclic oxide such as allyl glycidyl ether. Various other monomers may be used to complement the basic mixture desired to break up symmetry and provide less crystallinity or more flexibility in the polymer.

Catalysts useful for the purpose of the invention are known in the art and include, for example, such metal-containing catalysts as diethyl zinc and water used in an amount of about one mole of diethyl zinc to about 0.1 to 1.0 mole of water.

Another useful metal-containing catalyst is a catalyst of the product resulting from combining an inorganic and organic sulfur, selenium or tellurium compound with an organic aluminum, beryllium, cadmium, gallium and/or zinc compounds (e.g., hydrogen sulfide and diethyl zinc used in the ratio of about 0.5 to 2.5 moles of hydrogen sulfide to one mole of diethyl zinc).

Still another complex that may be used is antimony trifluoride and titanium trifluoride catalyst with a co-catalyst of lithium aluminum hydride, the fluoride and halide being mixed together under reflux conditions in an inert atmosphere. The mole ratio of catalyst to co-catalyst is from about 1.0:0.5 to 1.0:2.7. There can be employed about 0.005 to 5.0 weight percent of total catalyst based on polymerizable monomer.

Yet another catalyst that can be used in the present invention is zinc cyanide and ammonium chloride prepared by combining the two catalysts in a mole ratio of about 1.0:0.20 to 1.0:0.6 in an inert atmosphere at about 40° to 60° C. Also useful is a triphenyl aluminum and water catalyst prepared by reacting phenyl lithium and aluminum trichloride. The ratio of triphenyl aluminum to water can vary from about 1.0:0.05 to 1:1 mole. Also useful is antimony trioxide and diethyl zinc used in a ratio of 0.03:1 to 12.0:1 of organic metallic to inorganic oxide.

Other known catalysts are triisobutyl aluminum, triethyl aluminum, and zinc cobalticyanide. In addition, zinc hexacyanoferrate (II or III) may be used. It is prepared by reacting a zinc halide with potassium ferricyanide. Certain other metal-containing catalysts may also be used.

To obtain the best activity of the catalysts for polymerization, an organic material may be added to the catalysts as a complexing agent. Examples of organic materials for use in treating the catalysts are ethers, preferable of which are the aliphatic saturated monoethers such as bis-($\beta$-methoxy ethyl) ether or diglyme, ethylene glycol dimethyl ether or glyme, or triethylene glycol dimethyl ether. Other substances such as butyl Cellosolve and cyclohexylamine may also be used to activate the catalyst.

The amount of catalyst may vary from 0.0001 to 10.0 weight percent, preferably from 0.001 to 5.0 weight percent based on epoxide monomer, or monomers, the most preferable range being from 0.005 to 0.5 weight percent.

Filler used in the present invention is a very fine reinforcing silica such as fumed silica or silica aerogel of more than 50 square meters per gram of surface area, a fine carbon black, such as HAF (high abrasion furnace) black and SAF (super abrasion furnace) black, although other blacks and also other fillers have proven useful. The designated blacks which are generally characterized by a particle size of approximately 40 millimicrons or less and/or having some structure is most desirable because of the fineness of the particles. However, the present invention is not to be limited to such a choice of carbon black, for, as may be visualized, depending on the type of utility desired, blacks or fillers, or various degrees of coarseness or fineness, may be incorporated into the polymerizing monomer. Other carbon blacks which have proven useful as a filler are ISAF (intermediate super abrasion furnace), FEF (fast extrusion furnace) and SRF (semi-reinforcing furnace) black. Likewise, the present invention is not to be limited solely to black, but as above indicated, other reinforcing fillers, as hydrated and fumed silica and calcium silicate, have proven compatible with the present monomers and may be advantageously used.

Solvent used in the present invention is non-aqueous and is preferably one that does not form complexes or interfere with the polymerization. The solvent, of course, is not reactive with the polymerizable monomer, which monomer should be soluble in the solvent. The solvent should not contain any impurities which would affect the polymerization reaction. Examples of useful solvents are aliphatic hydrocarbons including butane, n-heptane, octane, pentane, and hexane. Other solvents as carbon tetrachloride, methylene chloride, aromatic hydrocarbons such as benzene, toluene, xylene and chlorobenzene and the like may also be used.

The solvents are used in an amount sufficient to dissolve the polymers so as to provide a liquid or fluid mass and to provide for the necessary transfer of heat. As the reaction proceeds, solvent addition provides an excellent means of controlling the polymerization temperature. The solvent can be added in one quick addition or over a period of several minutes depending on the viscosity desired in the mixture and the degree of dilution desired. Usually large excesses of solvent are to be avoided as this may require the subsequent addition of more heat to continue the polymerization and may reduce molecular weight.

It is also preferred to use a dispersing agent in combination with the filler, solvent and catalyst. Examples of dispersing agents are fatty acids, hydrogenated fatty acids, fatty acid esters, alkanolamines, compatible polymers, etc.

The aforementioned polymerizable monomer should be polymerized in an inert or non-oxidizing atmosphere. Examples of an inert atmosphere are argon, neon, helium, krypton or nitrogen. An example of a non-oxidizing atmosphere is vaporized monomers or solvents.

The polymerization should be conducted in a closed container. The pressure most commonly used in polymerization is one atmosphere, or under although pressures greater and lower than this have proven satisfactory for particular applications. The polymerization temperature will usually range from about 0° to 150° C. Preferred temperatures for polymerization are generally about 15° to 30° C. and the polymerization has been conducted at room temperature for the rubbers herein described.

The monomers or polymers may be compounded with the usual ingredients utilized to modify the characteristics of the finished product. Examples of useful compounds which can be mixed with the monomer or polymer are zinc oxide, stearic acid, sulfur, $TiO_2$, iron oxide, calcium oxide, plasticizers, antioxidants, as phenyl beta naphthylamine (PBNA), cross-linking inhibitors, as nitrobenzene, natural rubber, butadiene-styrene rubber, polyethylene-propylene rubber, nitrile rubber, acrylonitrile-styrene rubber, and the like and mixtures thereof.

Polymers of the present invention may be cured by sulfur and the like or by sulfur furnishing materials, organic peroxides, other curing and cross-linking materials, irradiation and so forth.

The following examples will serve to illustrate the present invention with more particularity to those skilled in the art.

Example I

A one-gallon stainless steel ball mill reactor (jar) containing 16 stainless steel balls of ½ inch diameter each and a neoprene rubber gasket to assure tight closure during polymerization was dried for 24 hours in a 140° C. oven.

The following ingredients were charged at room temperature into the reactor:

| | G. |
|---|---|
| HAF (high abrasion furnace) carbon black (predried for 24 hours at 140° C.) | 80 |
| Dry n-heptane | 200 |

The reactor was flushed with dry nitrogen and then 3.5 g. of diethyl zinc were added, and the reactor was closed and agitated on a 2-roll rotor for 2 hours. After the agitation, the reactor was opened, a nitrogen atmospheric blanket established, and the following ingredients added from a pressurized glass bottle:

| | | |
|---|---|---|
| Dry propylene oxide | g | 175.00 |
| Dry allyl glycidyl ether (40 cc.) | g | 38.80 |
| Water | cc | 0.48 |
| Nitrobenzene | cc | 0.18 |
| Diethyl zinc | cc | 3.50 |
| Phenyl beta naphthylamine (PBNA) | g | 1.06 |

The reactor was again closed and rotated at room temperature to polymerize the monomers in the presence of the carbon black. At the end of the polymerization, a solid, moist, tacky mass was obtained in which the balls were embedded.

A second polymerization run was made, similar to the foregoing run. The reaction time and percent conversion of each run are disclosed below:

| Run | Reaction Time (hours) | Conversion (Percent) |
|---|---|---|
| 1 | 72 | 73 |
| 2 | 90 | 90 |

Residual monomers and solvent were removed by vacuum stripping. The products of the runs were combined, and the resulting product contained about 31.6% carbon black. The product is a carbon black, polyether rubber composition in which the rubber is a copolymer of about 90 mole percent propylene oxide and 10 mole percent allyl glycidyl ether. The catalyst was not removed as it was deactivated or killed on exposure of the composition to the air.

Example II

The carbon black copolymer composition of Example I was mill-mixed with the following ingredients on a rubber mill:

| | P.p.h. |
|---|---|
| Santocure (N-cyclohexyl-2-benzothiazole sulfenamide) | 1 |
| Sulfur | 2 |
| Zinc oxide | 5 |
| Stearic acid | 1 |

(p.p.h.=parts per hundred of copolymer in the black copolymer composition).

The mixture was cured in a mold for 45 minutes at 287° F. and the resultant rubber vulcanizate exhibited the following properties after testing (Table A, below):

TABLE A

| | |
|---|---|
| 300% modulus, pounds per square inch | 540 |
| Tensile strength at break, p.s.i. | 1800 |
| Elongation, percent | 850 |
| Tear, p.s.i. | 415 |
| Hardness, Shore A | 62 |
| Abrasion resistance index | 67 |

A 90–10 propylene oxide allyl glycidyl ether copolymer prepared by conventional methods and to which was added on the mill HAF carbon black and the other compounding ingredients, molded and used in the same way, gave similar physical properties except that the abrasion resistance index was only 48–52.

Example III

A ball-mill reactor similar to that of Example I was charged with the following ingredients under nitrogen:

| | |
|---|---|
| HAF carbon black g | 80 |
| n-Heptane g | 200 |
| Diethyl zinc ml | 3.7 |

The reactor was closed and rotated for 2 hours. The following premixed composition was added to the reactor under a dry nitrogen atmosphere:

| | |
|---|---|
| Propylene oxide g | 200.00 |
| Allyl glycidyl ether (12 ml.) g | 11.60 |
| PBNA g | 1.06 |
| H$_2$O ml | 0.44 |
| Nitrobenzene ml | 0.18 |

The reactor was rotated at room temperature for four days to a 53% conversion. Residual monomers and solvent were removed. The resulting composition contained about 70 parts by weight of HAF black per 100 parts by weight of copolymer. The composition then was diluted with a rubbery copolymer of 97 mol percent propylene oxide and 3 mol percent allyl glycidyl ether rubber (polymerized in the absence of carbon black or other pigment) to obtain a final composition affording 50 parts HAF black per 100 parts of copolymer.

This mixture was compounded with 1 part by weight of methyl Tuads (tetramethylthiuram disulfide) and 1 part of sulfur based on 100 parts by weight of the total copolymer present and cured for 45 minutes at 287° F. in a mold. On testing the vulcanizate, the following properties were obtained:

TABLE B

| | |
|---|---|
| 300% modulus, p.s.i. | 910 |
| Tensile at break, p.s.i. | 2025 |
| Elongation, percent | 665 |
| Tear, pounds per inch | 480 |
| Angle abrader (Akron angle abrader, or Wallace croydon abrader) index | 68 |
| Goodrich flexometer (temp. increases 38% set) ° F. | 68 |

A control sample prepared by polymerizing the monomers, in the same ratios but without the black, and subsequent to polymerization, while the rubber was being milled, mixing in the carbon black and other compounding ingredients, curing and testing gave similar physical results except that the abrasion index was only 48–52.

Example IV

The method of this example was similar to the preceding examples except that only propylene oxide was used as the monomer and the filler was a dried, finely divided, precipitated silica (HiSil). About 1 mole percent ZnEt$_2$H$_2$O based on the monomer was used. All the polymerization ingredients were added at once to the reactor. After polymerization, the silica-propylene ether rubber composition was compounded and cured with dicumyl peroxide to give a reinforced rubbery vulcanizate.

Examples of polymerizable monomers according to the present invention include oxetanes, an unsubstituted cyclic oxide of 3 carbon atoms and 1 oxygen atom, 3,3-dimethyl oxetane, 3,3-diethyl oxetane, 3-ethyl-3-butyl oxetane, 3-allyl oxetane, 3-methyl-3-methoxyallyl oxetane and the like and mixtures thereof.

Example V

By substituting for the monomers in Example III, 295 g. of 3,3-dimethyl oxetane and 11.60 g. allyl glycidyl ether and otherwise charging the same amounts of HAF carbon black, diethyl zinc, n-heptane, PBNA, H$_2$O and nitrobenzene and following the same procedure, an elastomeric black reinforced product was obtained that could be compounded with the standard sulfur-accelerator combination to give a stable, useful rubbery product.

What is claimed is:

1. In the method of making polyethers by the polymerization of at least one polymerizable organic cyclic oxide monomer having a ring of from 2 to 3 carbon atoms and one oxygen atom and up to a total of 20 carbon atoms in the presence of a catalyst composition effective for the polymerization of said monomer and for a period of time and at a temperature sufficient to effect said polymerization, the improvement comprising, under an inert atmosphere and in non-reactive solvent for said polyether, (1) shear agitating in the presence of grinding media a finely divided reinforcing filler in admixture with said catalyst composition to deagglomerate said filler and intimately mix it with said caltalyst composition in said solvent to form a dispersion, and (2) mixing said monomer with the resulting dispersion and polymerizing said monomer in the presence of said filler and said catalyst composition while continuing to subject the resulting mixture to said shear agitation in the presence of said grinding media to disperse said filler throughout said monomer and polymer as it is formed and to provide a polyether containing said filler intimately dispersed throughout said polyether and exhibiting improved reinforcement on curing.

2. In the method of making polyethers by the polymerization of at least one polymerizable organic cyclic oxide monomer having a ring of from 2 to 3 carbon atoms and one oxygen atom and up to a total of 20 carbon atoms in the presence of a catalyst composition effective for the polymerization of said monomer and for a period of time and at a temperature sufficient to effect said polymerization, the improvement comprising, under an inert atmosphere and in a non-reactive solvent for said polyether, (1) shear agitating in the presence of grinding media a finely divided reinforcing filler in admixture with at least a portion of said catalyst composition to deagglomerate said filler and intimately mix it with said catalyst composition in said solvent, and (2) mixing said monomer with the resulting dispersion and any additional amount of said catalyst composition required and polymerizing said monomer in the presence of said filler and said catalyst composition while continuing to subject the resuling mixture to said shear agitation in the presence of said grinding media to provide a polyether containing said filler intimately dispersed throughout said polyether and exhibiting improved abrasion resistance on curing, said filler being selected from the group consisting of carbon black, fume silica, silica aerogel, hydrated silica and calcium silicate.

3. The method according to claim 2 in which said filler is carbon black.

4. In the method of making polyethers by the polymerization of at least one polymerizable organic cyclic oxide monomer having a ring of from 2 to 3 carbon atoms and one oxygen atom and up to a total of 20 carbon atoms in the presence of a catalyst composition effective for the polymerization of said monomer and for a period of time and at a temperature sufficient to effect said polymerization, the improvement comprising, under an inert atmosphere and in a non-reactive solvent for said polyether, (1) shear agitating in the presence of grinding media a finely divided reinforcing filler in admixture with at least a portion of said catalyst composition to deagglomerate said filler and intimately mix it with said catalyst composition in said solvent, and (2) adding said monomer and the remainder of said catalyst composition to the resulting dispersion and polymerizing said monomer in the presence of said filler and said catalyst composition while continuing to subject the resulting mixture to said shear agitation in the presence of said grinding media to provide a polyether containing said filler intimately dispersed throughout said polyether and exhibiting improved abrasion resistance on curing, said filler being selected from the group consisting of carbon black, fume silica, silica aerogel, hydrated silica, and calcium silicate.

5. The method according to claim 4 where the filler is carbon black.

6. The product produced by the method of claim 3.

7. The product produced by the method of claim 5.

References Cited

UNITED STATES PATENTS

| 3,201,371 | 8/1965 | Behrends et al. | |
| 3,325,442 | 6/1967 | McManimie | 260—41 |

FOREIGN PATENTS 601,793  3/1961  Belgium.

OTHER REFERENCES

Gaylord: High Polymers, vol. XIII, Interscience Publishers, 1963, QD305E763, page 171 relied on.

MORRIS LIEBMAN, *Primary Examiner.*

S. L. FOX, *Assistant Examiner.*